April 21, 1959
B. E. LENEHAN
2,883,622
ALTERNATING-CURRENT RESPONSIVE DEVICES
Filed Nov. 27, 1953
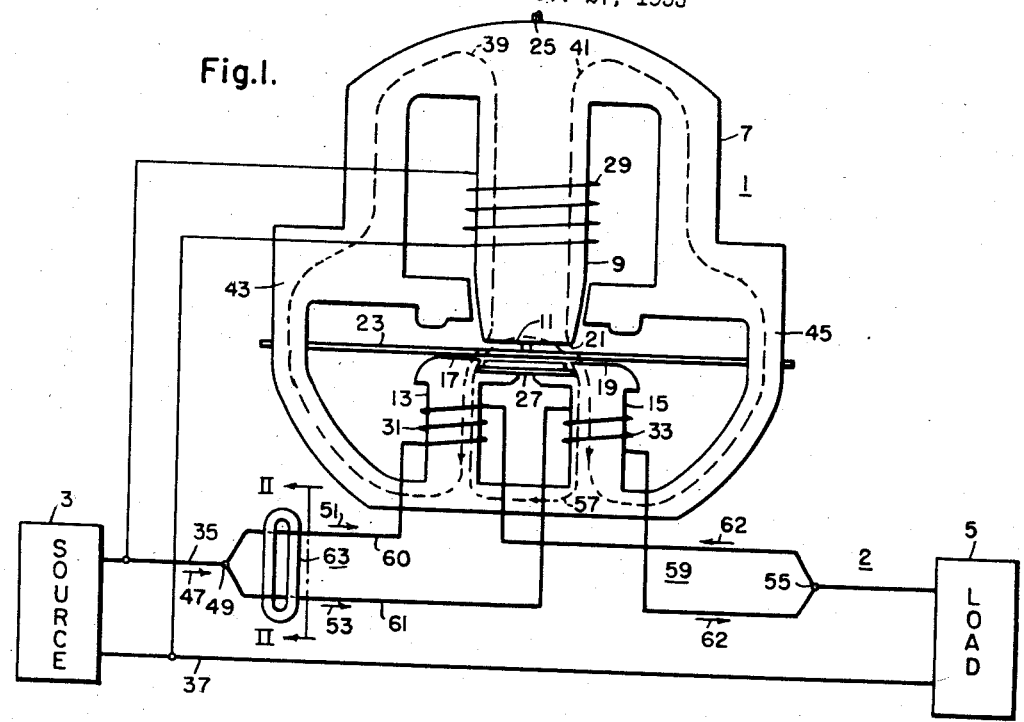
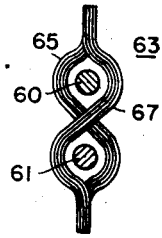
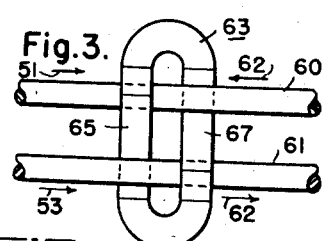
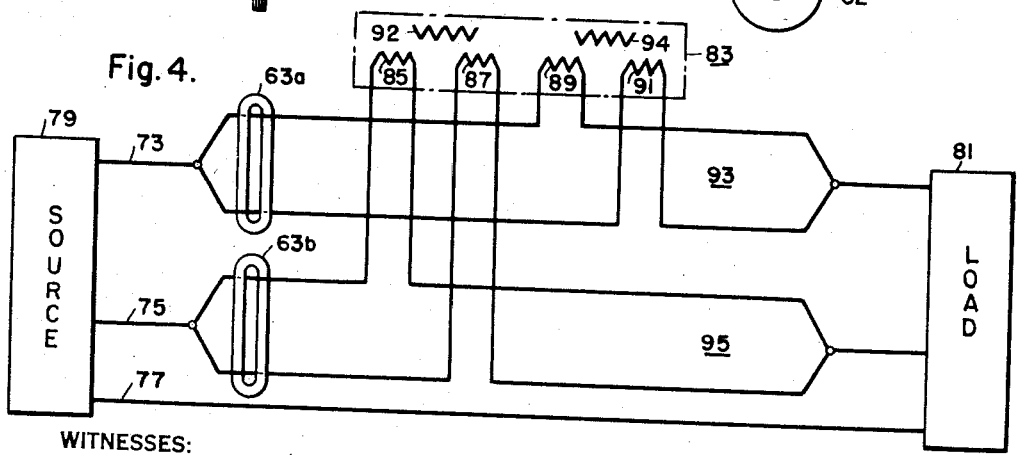
WITNESSES:
E. A. McCloskey.
David M. Schiller.
INVENTOR
Bernard E. Lenehan.
BY C. L. Freedman
ATTORNEY

United States Patent Office 2,883,622
Patented Apr. 21, 1959

2,883,622
ALTERNATING-CURRENT RESPONSIVE DEVICES

Bernard E. Lenehan, Bloomfield, N.J., assignor to Westinghouse Electric Corporation, East Pittsburgh, Pa., a corporation of Pennsylvania Application November 27, 1953, Serial No. 394,642

3 Claims. (Cl. 324—137)

This invention relates to devices responsive to alternating quantities and it has particular relation to alternating current watthour meters.

When the current windings of an alternating current watthour meter are connected for parallel energization in accordance with current of an alternating current circuit, a closed circuit path is established which surrounds the voltage magnetic flux produced by energization of the voltage winding of the watthour meter. Electromotive forces are induced in the closed circuit path by the alternating voltage magnetic flux which direct current through the path thereby creating magnetic flux which cooperates with the voltage magnetic flux to produce a resultant flux which has an adverse effect on the performance of the watthour meter.

In accordance with the invention this resultant flux may be substantially corrected by providing impedance means associated with the closed circuit path for controlling the circulating current and the magnetic flux produced thereby. The impedance means may take the form of a magnetic loop or magnetic loops having magnetic flux produced therein by current flowing in the closed path.

In a preferred embodiment of the invention the impedance means comprises a magnetic member having a configuration presenting a closed path for magnetic flux traversing the magnetic member. The magnetic member is positioned relative to the closed path established by the parallel connection of the current windings to present a relatively large impedance to current circulating in the closed path and to present substantially zero impedance to the load current entering and leaving the parallel-connected current windings.

It is, therefore, an object of the invention to provide improved means for controlling alternating magnetic flux produced by energization of an alternating current-responsive device.

It is a further object of the invention to provide impedance means associated with a closed circuit path established by the parallel connection of a pair of current windings of a watthour meter for controlling the magnitude of current circulating in said path produced by voltage magnetic flux of the watthour meter linking said path.

It is another object of the invention to provide impedance means in the form of a magnetic member disposed in a loop with opposing sides of the loop having portions spaced from the plane of the loop to define a figure-of-eight configuration.

It is a still further object of the invention to provide an alternating current watthour meter including voltage and current windings effective when energized to produce alternating magnetic fluxes with the current windings being connected in parallel to establish a closed path linking the voltage magnetic flux, the closed path having associated therewith impedance means presenting a relatively large impedance to current circulating in the closed path and presenting substantially zero impedance to current flowing in parallel through the current windings.

It is still another object of the invention to provide a watthour meter as defined in the preceding paragraph wherein said impedance means is in the form of a magnetic member disposed in a loop with the loop linking current circulating in said closed path.

Other objects of the invention will be apparent from the following detailed description taken in conjunction with the accompanying drawing in which:

Figure 1 is a view in front elevation of an alternating current watthour meter embodying the invention;

Fig. 2 is an enlarged view taken along the line II—II of Fig. 1;

Fig. 3 is a view in side elevation of Fig. 2; and

Fig. 4 is a schematic view illustrating connections of a polyphase watthour meter embodying the invention.

Referring to the drawing there is shown in Fig. 1 an alternating current watthour meter 1 connected to produce a response representative of the energy of an alternating current circuit 2 connecting a source 3 and a load 5. For present purposes it will be assumed that the circuit 2 is a two wire, single phase circuit operating at a frequency of 60 cycles per second.

The watthour meter 1 includes a magnetic structure 7 having a voltage magnetic pole 9 with a pole face 11 and a pair of current magnetic poles 13 and 15 with pole faces 17 and 19, respectively. As shown, the pole faces 17 and 19 are disposed in a common plane which is spaced from the pole face 11 to define an airgap 21 in which an electroconductive armature in the form of a disc 23 is disposed. Conveniently the disc 23 may be mounted on a shaft 25 for rotation in a manner well understood in the art. A conventional magnetic shunt 27 is positioned between the current magnetic poles 13 and 15 adjacent the pole faces 17 and 19 for controlling the load response of the watthour meter.

In order to produce alternating magnetic fluxes establishing a shifting magnetic field for influencing the disc 23, the voltage magnetic pole 9 is surrounded by a voltage winding 29 and the current magnetic poles 13 and 15 are surrounded by current windings 31 and 33, respectively. The voltage winding 29 is connected for energization in accordance with voltage of circuit 2 appearing across conductors 35 and 37 and the current windings 31 and 33 are connected for energization in accordance with current flowing through the conductor 35 of the circuit 2.

When the voltage winding 29 is energized in accordance with voltage of circuit 2 alternating voltage magnetic flux is established which traverses the airgap 21 and the disc 23 positioned in the airgap. Such voltage magnetic flux is represented in Fig. 1 by the dotted lines 39 and 41 which have arrows associated therewith for the purpose of indicating an instantaneous direction of flux flow. It will be observed that the voltage magnetic flux reprecented by the line 39 passes through the voltage magnetic pole 9 and traverses the airgap 21 and the disc 23 to enter the current magnetic pole 13. This voltage magnetic flux then returns to the voltage magnetic pole 9 through the left-hand arm 43 of the magnetic structure 7 as viewed in Fig. 1. In a similar manner the voltage magnetic flux represented by the line 41 traverses the airgap 21 and the disc 23 to enter the current magnetic pole 15 and returns to the voltage magnetic pole 9 through the right-hand arm 45 of the magnetic structure 7.

For certain purposes it may be desirable to connect the current windings 31 and 33 for parallel energization in accordance with current traversing the conductor 35 of the circuit 1. An instantaneous direction of current flow through conductor 35 may be represented by the arrow 47. As shown in Fig. 1 the conductor 35 includes in series therewith two parallel branches each including a separate one of the windings 31 and 33. Consequently, current flowing in the direction indicated by the arrow 47 through conductor 35 divides into two substantially equal portions at the junction 49 to effect the parallel energization of the windings 31 and 33. Instantaneous directions of flow of the enerezizing currents may be indicated by arrows 51 and 53. Such portions then combine at the junction 55.

It is observed by inspection of Fig. 1 that the current windings 31 and 33 are oppositely poled so that when winding 31 directs a magnetomotive force upwardly in the current magnetic pole 13, the winding 33 establishes a substantially equal downwardly directed magnetomotive force in the current magnetic pole 15. The resulting flow of magnetic flux is represented in part by a dotted line 57 and has an instantaneous direction of flow represented by an arrow associated with the line 57.

It is noted that with the parallel connection of the windings 31 and 33 a closed circuit path represented generally by the numeral 59 is established intermediate the junctions 49 and 55 which includes the windings 31 and 33 in series. By inspection of Fig. 1 it is observed that this path surrounds the voltage magnetic flux represented by the dotted lines 39 and 41. The voltage magnetic flux linking the path 59 induces therein electromotive forces which direct current around the path thereby establishing a magnetic flux which is displaced in time phase relative to the voltage magnetic flux. An instantaneous direction of flow of current circulating through the path 59 is represented by arrows 62 associated with such path. The magnetic flux established by this circulating current cooperates with the voltage magnetic flux to produce a resultant magnetic flux having a magnitude somewhat less than the magnitude of the voltage magnetic flux and which is displaced in time phase with respect to the voltage magnetic flux. This resultant magnetic flux tends to adversely affect the response of the watthour meter.

In accordance with the invention means are provided for controlling the magnitude of the current curculating in the path 59 to thereby control the magnitude of the magnetic flux produced thereby. Such means may conveniently take the form of impedance means associated with the path 59 and comprising a magnetic member disposed in a loop with the loop being positioned to link current circulating through the path 59.

If a single magnetic loop is employed and is positioned to surround one of the portions 60 or 61 of the closed path 59, a certain impedance is presented to current circulating through the path 59. In addition, a certain impedance is presented to load current traversing the portion of the closed path linked by the magnetic loop which results in an unequal distribution of load current between the portions 60 and 61 of the path 59.

In order to substantially equalize the distribution of load current between the portions 60 and 61 of the path 59, a pair of magnetic loops may be provided with each loop surrounding a separate one of the portions 60 and 61. However, with such arrangement a certain impedance is presented to load current traversing the conductor 35. For certain installations such impedance may be objectionable.

In order to present substantially zero impedance to load current flowing in conductor 35 and to present substantial impedance to current circulating through the path 59, a single magnetic loop may be positioned to link each of the portions 60 and 61 of the path 59 so that the circulating current establishes magnetomotive forces which act in the same direction about the magnetic loop, and so that the load current establishes magnetomotive forces which act in opposite directions about the magnetic loop.

To this end a magnetic loop may be positioned to surround each of the portions 60 and 61 with the portions 60 and 61 being arranged to direct circulating current traversing such portions in a common direction through the magnetic loop, and to direct load current traversing such portions in opposite directions through the loop. In order to provide such arrangement one of the portions 60 and 61 may be wound in such manner as to direct currents carried thereby in the proper directions through the loop.

In accordance with a preferred embodiment of the invention a single magnetic loop links current traversing each of the portions 60 and 61 of the path 59 and is effective to present substantial impedance to current circulating through the path 59 and to present substantially zero impedance to load current traversing the path 59. The configuration of the loop is such that winding of the portions 60 and 61 for the purpose of directing currents carried by such portions through the loop in the proper directions is not required.

In the specific embodiment of Fig. 1 the impedance means is illustrated as comprising a magnetic member 63 disposed in the form of a loop. As clearly shown in Fig. 2 opposing sides 65 and 67 of the loop have portions which are spaced from the plane of the loop to define a figure-of-eight configuration of the member 63. The member 63 may be constructed of any suitable magnetic material and may either be of solid construction or composed of a number of similar laminations. Preferably, the member 63 is constructed of a plurality of laminations of magnetic material, preferably a grain oriented magnetic material such as that known as Hipersil. Each lamination may be formed as by a stamping operation with the configuration illustrated in Figs. 2 and 3. The laminations may be secured to one another in any suitable manner to provide the magnetic member 63.

In order to present a relatively large impedance to current circulating through the closed path 59 and to present substantially zero impedance to current flowing in the conductor 35 of the circuit 1, the magnetic member 63 is positioned to link separate portions of the closed path 59. For example, as shown in Figs. 1 and 2 the portions 60 and 61 of the closed path 59 direct current circulating through such path in opposing directions through the magnetic loop whereas the portions 60 and 61 direct current flowing in parallel through the windings 31 and 33 in a common direction through the magnetic loop.

With the member 63 positioned in the manner described a substantial impedance is presented to current circulating through the closed path 59. This may be explained by considering the fact that magnetomotive forces established by such circulating current act in the same direction about the member 63 to direct substantial magnetic flux through the member 63. Consequently, electromotive forces induced in the closed path 59 by means of the magnetic flux traversing the member 63 oppose electromotive forces induced in the path 59 by the voltage magnetic flux. By proper selection of materials and dimensions of the member 63, current circulating through the path 59 may be limited to an acceptable value.

As mentioned hereinbefore, substantially zero impedance is presented by the member 63 to current traversing the conductor 35 of the circuit. This may be explained by considering the fact that magnetomotive forces established by load current traversing the portions 60 and 61 of the path 59 act in opposite directions about the member 63 with the result that substantially zero magnetic flux traverses the member 63 in response to energization thereof by load current.

The invention may also be applied to devices energized from three-wire circuits such as three-phase, three-wire circuits. Such a circuit is illustrated in Fig. 4 and includes phase conductors 73, 75 and 77 connecting a source 79 and a suitable load 81. For present purposes, it is assumed that the three-phase, three-wire circuit operates at a frequency of 60 cycles per second.

In order to produce a response representative of energy of the three-phase, three-wire circuit a two-element watthour meter indicated by the broken line 83 may be employed. The watthour meter 83 is represented schematically and is shown as including four current windings 85, 87, 89 and 91 and two voltage windings 92 and 94. For certain purposes it may be desirable to provide parallel energization of the current windings 85 and 87 in accordance with current traversing the phase conductor 75, and to provide parallel energization of current windings 89 and 91 in accordance with current traversing the phase conductor 73. With such an arrangement two closed circuit paths represented generally by the numerals 93 and 95 are established with the path 93 including the windings 89 and 91 and the path 95 including the windings 85 and 87. As described in connection with Fig. 1 magnetic fluxes are created by currents circulating through such paths caused by electromotive forces induced therein by voltage magnetic flux produced by energization of windings 92 and 94 and linking such paths.

In order to control the magnitude of the currents circulating in the paths 93 and 95 for controlling the magnitude of magnetic fluxes created thereby separate impedance means may be associated with each of the closed paths. As shown in Fig. 4 such impedance means may take the form of magnetic members 63a and 63b each being similar to the magnetic member 63 illustrated in Figs. 1, 2 and 3. As described in connection with Fig. 1 the members 63a and 63b are disposed relative to the paths 93 and 95 to present substantial impedance to currents circulating through such paths and to present substantially zero impedance to currents traversing the associated phase conductors.

Since numerous changes may be made in the above-described apparatus and circuits, and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In a watthour meter, a voltage winding effective when energized in accordance with voltage of an alternating current circuit for producing an alternating voltage magnetic flux, a pair of current windings connected for parallel energization in accordance with current of said circuit for producing an alternating current magnetic flux, a closed circuit path including said pair of current windings, said closed circuit path being positioned in the path of said voltage flux to link said voltage flux, said current windings being connected so that voltages induced in said current windings by said voltage flux act cumulatively relative to each other about the closed path to circulate currents through the path, and impedance means associated with said closed path for controlling current circulating through said path produced by said voltage flux, said impedance means comprising a magnetic loop member linking a pair of spaced portions of said closed path, said closed path portions directing current circulating through the closed path in directions for establishing a pair of magnetomotive forces in the loop member acting cumulatively relative to each other about the loop member, and directing current flowing in the alternating current circuit in directions for establishing a pair of magnetomotive forces in the loop member acting in opposition relative to each other about the loop member.

2. In a watthour meter, a voltage winding effective when energized in accordance with voltage of an alternating current circuit for producing an alternating voltage magnetic flux, a pair of current windings connected for parallel energization in accordance with current of said circuit for producing an alternating current magnetic flux, a closed circuit path including said pair of current windings, said closed circuit path being positioned in the path of said voltage flux to link said voltage flux, said current windings being connected so that voltages induced in said current windings by said voltage flux act cumulatively relative to each other about the closed path to circulate currents through the path, and impedance means associated with said closed path for controlling current circulating through said path produced by said voltage flux, said impedance means comprising a magnetic loop member having a first opening extending transverse to the plane of the loop member, said loop member including side portions having parts displaced from said plane in the direction of extension of said first opening to define a figure-of-eight configuration providing a pair of second openings extending in directions parallel to said plane, said closed path including a pair of spaced portions each extending through a separate one of said second openings parallel to said plane, said closed path portions directing current circulating through the closed path in opposing directions through said second openings for establishing a pair of magnetomotive forces in the loop member which act cumulatively relative to each other about the loop member, and directing current flowing in the alternating current circuit in a common direction through said second openings for establishing a pair of magnetomotive forces in the loop member which act in opposition relative to each other about the loop member.

3. In a watthour meter responsive to energy of an alternating current circuit, a voltage winding effective when energized in accordance with voltage of the circuit for producing an alternating voltage flux, a pair of current windings, a pair of branch circuits each including a separate one of the current windings, terminal means connecting the branch circuits in parallel circuit relation, said terminal means being energizable by current flowing in the circuit to direct a separate component of current flowing in the circuit through each of the current windings for producing an alternating current flux, a closed circuit path including the branch circuits and the current windings in series circuit relation linking the voltage flux, said current windings being connected so that voltages induced in the current windings by said voltage flux act cumulatively relative to each other about the closed path to circulate currents through the closed path, and impedance means for presenting substantial impedance to current circulating through the closed path, and presenting substantially zero impedance to current flowing in the circuit, said impedance means comprising a magnetic loop member having a first opening extending transverse to the plane of the loop member, said loop member including side portions having parts displaced from said plane in the direction of extension of said first opening to define a figure-of-eight configuration providing a pair of second openings extending in directions parallel to said plane, each branch circuit including a portion extending through a separate one of said second openings parallel to said plane, said branch circuit portions directing current circulating through the closed path in opposing directions through said second openings for establishing a pair of magnetomotive forces in the loop member which act cumulatively relative to each other about the loop member, and directing current flowing in the alternating current circuit in a common direction through said second openings for establishing a pair of magnetomotive forces in the loop member which act in opposition relative to each other about the loop member.

References Cited in the file of this patent

UNITED STATES PATENTS

| 1,686,712 | Rutter | Oct. 9, 1928 |
| 1,729,713 | Dicke | Oct. 1, 1929 |
| 2,328,728 | Leippe | Sept. 7, 1943 |

FOREIGN PATENTS

| 405,055 | Great Britain | Feb. 1, 1934 |